US012355760B2

(12) United States Patent
Tan et al.

(10) Patent No.: US 12,355,760 B2
(45) Date of Patent: Jul. 8, 2025

(54) MULTI-FACTOR AUTHENTICATION (71) Applicant: Xero Limited, Wellington (NZ)

(72) Inventors: Steven Tan, Wellington (NZ); Nathan Kear, Wellington (NZ)

(73) Assignee: Xero Limited, Wellington (NZ)

(*) Notice: Subject to any disclaimer, the term of this patent is extended or adjusted under 35 U.S.C. 154(b) by 21 days.

(21) Appl. No.: 18/028,374

(22) PCT Filed: Aug. 19, 2021

(86) PCT No.: PCT/NZ2021/050136
§ 371 (c)(1),
(2) Date: Mar. 24, 2023

(87) PCT Pub. No.: WO2022/182251
PCT Pub. Date: Sep. 1, 2022

(65) Prior Publication Data
US 2023/0396609 A1 Dec. 7, 2023

(30) Foreign Application Priority Data
Feb. 26, 2021 (AU) ................. 2021900542

(51) Int. Cl.
*G06F 21/00* (2013.01)
*H04L 9/40* (2022.01)
(52) U.S. Cl.
CPC .... *H04L 63/0846* (2013.01); *H04L 2463/082* (2013.01)

(58) Field of Classification Search
CPC .......... H04L 63/0846; H04L 2463/082; H04L 9/0872; H04L 9/12; H04L 63/083; H04W 12/61; H04W 12/06; G06F 2221/2137; G06F 21/31
See application file for complete search history.

(56) References Cited

U.S. PATENT DOCUMENTS

| | | | |
|---|---|---|---|
| 7,874,010 B1 * | 1/2011 | Perlman | H04L 9/088 713/168 |
| 9,106,405 B1 * | 8/2015 | Roth | H04L 63/068 |
| 10,461,939 B2 * | 10/2019 | Church | H04L 63/0853 |
| 10,609,037 B2 * | 3/2020 | Jackson | H04L 63/1408 |
| 10,878,080 B2 * | 12/2020 | Hitchcock | G06F 21/45 |
| 2003/0131238 A1 * | 7/2003 | Vincent | H04L 9/3247 713/176 |

(Continued)

OTHER PUBLICATIONS

Decusatis et al., "Impact of Cyberattacks on Precision Time Protocol", IEEE, May 2020, retrieved on [Nov. 22, 2021]. Retrieved from the Internet <URL: https://ieeexplore.ieee.org/stamp/stamp.jsp?tp=&arnumber=8721270> entire document.

*Primary Examiner* — Kendall Dolly
(74) *Attorney, Agent, or Firm* — Young Basile Hanlon & MacFarlane, P.C.

(57) ABSTRACT

A method comprises sending, from an authentication application deployed on a second computing device to the system, a first authentication code, the first authentication code being generated from a shared code and an authentication application time, wherein the shared code is a code previously shared between the second computing device and the system, and the authentication application time is based on a first current device time of the second computing device and an offset parameter value.

20 Claims, 2 Drawing Sheets

(56) References Cited

U.S. PATENT DOCUMENTS

| | | | |
|---|---|---|---|
| 2005/0132192 A1* | 6/2005 | Jeffries | H04L 9/3271 |
| | | | 713/169 |
| 2006/0036857 A1* | 2/2006 | Hwang | G06F 21/31 |
| | | | 713/168 |
| 2006/0064493 A1* | 3/2006 | Hammell | H04L 63/0815 |
| | | | 709/227 |
| 2006/0251256 A1* | 11/2006 | Asokan | H04W 12/04 |
| | | | 380/270 |
| 2007/0101412 A1* | 5/2007 | Yang | G06F 21/305 |
| | | | 726/5 |
| 2010/0228988 A1* | 9/2010 | Walker | G07F 7/08 |
| | | | 713/184 |
| 2011/0197266 A1* | 8/2011 | Chu | H04L 9/3228 |
| | | | 726/5 |
| 2014/0208400 A1* | 7/2014 | Henshaw | H04L 67/04 |
| | | | 726/5 |
| 2016/0337861 A1* | 11/2016 | Hawkes | H04L 63/166 |
| 2019/0253404 A1* | 8/2019 | Briceno | H04L 63/08 |
| 2019/0312726 A1* | 10/2019 | Sierra | H04L 63/104 |
| 2020/0220864 A1* | 7/2020 | Goodsitt | H04L 9/3228 |
| 2022/0046003 A1* | 2/2022 | Guo | H04L 9/12 |
| 2023/0196357 A9* | 6/2023 | Gallagher, III | H04L 67/02 |
| | | | 705/71 |
| 2023/0396609 A1* | 12/2023 | Tan | H04W 12/61 |

* cited by examiner

MULTI-FACTOR AUTHENTICATION

CROSS-REFERENCE TO RELATED APPLICATION(S)

This application is a 371 national phase application of International Application Serial No. PCT/NZ2021/050136, filed Aug. 19, 2021, which claims priority to and the benefit of Australian Patent Application Serial No. 2021900542, filed Feb. 26, 2021, the entire disclosures of which are hereby incorporated by reference.

TECHNICAL FIELD

Embodiments generally relate to systems, methods and computer-readable media for performing multi-factor authentication processes.

BACKGROUND

Multi-factor authentication processes, such as two factor authentication processes, generally involve a first step whereby a user seeking to be authenticated or verified with a server-side application, such as a website, or a remote system, provides login details, such as a login name and password, to the server or remote system. The server or system then uses the login details to identify a computing device associated with the user (e.g. a mobile phone), and transmits a verification or validation request or "push" notification to the computing device. As the second step of the authentication process, the user is required to provide an authentication code to the server or system as an extra layer of security, keeping access to the user's account more secure. The verification code is generated by the computing device using a shared code (previously shared between the system and the computing device) and device time of the computing device. The server or system then generates an authentication using the shared code and the system time, and if the system generated authentication code corresponds with the device generated authentication code, the user is authenticated.

However, sometimes and despite a correct shared code being provided to the server or system, the server or system user fails to authenticate the user and/or issues an error message.

It is desired to address or ameliorate one or more shortcomings or disadvantages associated with prior multi-factor authentication processes, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method comprising sending, from an authentication application deployed on a second computing device to the system, a first authentication code, the first authentication code being generated from a shared code and an authentication application time, wherein the shared code is a code previously shared between the second computing device and the system, and the authentication application time is based on a first current device time of the second computing device and an offset parameter value; receiving, at the second computing device, an authentication error message from the system; responsive to receiving the authentication error message, determining, by the authentication application, a timing synchronization measure between the application time and system time; determining, by the authentication application, an offset parameter value based on the timing synchronization measure; determining, by the authentication application, a synchronized authentication application time based on a subsequent current device time of the second computing device and the updated offset parameter value; sending, from the authentication application to the system, a second authentication code, the second authentication code being generated from the shared code and the synchronized authentication application time.

The method may further comprise receiving, at a first computing device from a system in communication with the first computing device across a communications network, the first verification request in response to a first authentication request for a user; wherein the first authentication code is sent in response to receiving the first verification request.

In some embodiments, the method may comprise receiving, from the system at the first computing device, a second verification request in response to a subsequent second authentication request for the user.

In some embodiments, the method may comprise sharing the secret code between the second computing device and the system during registration of the user with an application of the system.

The method may comprise maintaining, by the authentication application, a register of offset parameter values, the register comprising the offset parameter value associated with the system, and one or more other offset parameter values associated with respective other systems. In some embodiments, the method may comprise automatically updating, by the authentication application, the offset parameter value as the sum of the offset parameter value and the determined timing synchronization measure.

In some embodiments, determining the timing synchronization measure may comprise: sending, by the authentication application, a timing request to the system; receiving, by the authentication application, a timing response to the timing request from the system; and determining the timing synchronization measure from the timing response. In some embodiments, determining the timing synchronization measure may comprise: sending, by the authentication application, a timing request for UTC to a universal coordinated time (UTC) server; receiving, by the authentication application, a timing response from the UTC server; and determining the timing synchronization measure from the timing response. The timing response may comprise: (i) an origin timestamp indicative of the device time when sending the timing request; (ii) a receive timestamp indicative of the system time when the timing request was received; (iii) a transmit timestamp indicative of the system time when sending the timing response; and (iv) a destination timestamp indicative of the device time when the timing response was received.

In some embodiments, the method may comprise sending, from a third computing device to the system, the first authentication request for the user. In some embodiments, the method further comprises sending, from the third computing device to the system, the second authorisation request for the user. In some embodiments, the first computing device is the third computing device and is associated with the user. In some embodiments, the first computing device and the third computing devices are different devices and are both associated with the user. In some embodiments, the first computing device is the second computing device and is associated with the user. In some embodiments, the first computing device and the second computing devices are different devices and are both associated with the user.

The first authentication request for the user may be a second or subsequent step of a multi factor authentication process.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform any one of the described methods.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Various ones of the appended drawings merely illustrate example embodiments of the present disclosure and cannot be considered as limiting its scope.

DESCRIPTION OF EMBODIMENTS

Embodiments generally relate to systems, methods and computer-readable media such as a non-transitory computer medium for performing operations such as a multi-factor authentication process.

Some authorisation errors that arise during two or multi-factor authorisation processes between computing devices and systems or servers are due to clock drifts or time synchronization issues between the computing device (or application deployed thereon) and the system or server performing the verification or authentication of the user. When a first device authorisation code is generated using a shared code and the device time is received by the system, the system generates a system authorisation code using the shared code and the system time. If the system determines that system authorisation code does not equate to the device authorisation code, authentication fails. One potential reason for the authorisation failure may be because the device time used by the application responsible for generating the authorisation code is not synchronized (is "out of synch") with the clock of the system performing the authorisation, resulting in two different authorisation codes being generated.

In the described methods and systems, when an authorisation error is received, an authentication application proactively and automatically determines any time synchronization error between a computing device hosting the authentication application and a system with which a user at the computing device is seeking to authorise themselves. The authorisation application then generates and transmits a subsequent authorisation code to the system. The subsequent authorisation code is generated using the shared code and a synchronized authentication application time. The synchronized authentication application time is determined based on a current device time, the time synchronization error and in some embodiments, an offset parameter value. For example, the offset parameter value may be indicative of a previously determined discrepancy between the device time and the system time, or at an initial stage, may be set as zero, and may have been used to generate the authorisation code that resulted in the authorisation error. The offset parameter value may be updated based on the determined time synchronization error and the synchronized authentication application time may be the current device time adjusted by the updated offset parameter value. As a result, the subsequent authorisation code is generated based on an authentication application time that is synchronized with the system time.

In this way, the described embodiments mitigate or reduce any negative impact or undesirable user experience with authorisation errors arising due to such time synchronization issues. Some embodiments further resolve such authorisation errors without requiring any user input, and may be performed in a transparent manner such that the issue is resolved without the user even being aware that a time synchronization issue, and accordingly an authorisation error, occurred.

Additionally, as any time synchronization issues impacting the ability of the user to be verified may be resolved more quickly as they do not require the user to determine that the problem may be a time synchronization issue and attempt to take steps to resolve it manually. Further, if the issue is not a time synchronization issue, this in itself is helpful as it can be eliminated as a cause of the authentication failure, thereby reducing the burden on the user or systems administrator in detecting a problem with the authentication application and/or an authentication module of the system.

Further, by using an offset parameter to manage any time synchronization errors between the computing device and system, the timing error between the computing device and system can be recorded or factored into the updated offset parameter value without requiring any change to be made to the device clock. And similarly, any change made to the device clock does not impact the previously determined timing error, and consistency is maintained. The updated offset parameter value may then be used for a subsequent authorisation process, and assuming further clock drift hasn't occurred, at least mitigates the chance of a time synchronization error causing an authorisation failure.

Yet further, the authentication application 126 may maintain an offset parameter value for each of a plurality of systems hosting applications with which the user holds accounts, allowing the authentication application 126 to cooperate with a plurality of different systems while mitigating synchronization errors causing authentication failures.

Additionally or alternatively, the authentication application 126 may maintain an offset parameter value for a system hosting an application with which the user (or users) of the computing device hold multiple accounts. Accordingly, in some embodiments the authentication application 126 may maintain a single offset parameter value applicable to mitigate synchronization errors across multiple user accounts held with a same application hosted by the system.

The term "system time" may refer to a time of a system clock or internal clock of the system or server (such as 11:59:00), or a time step indicative of a time of a system clock or internal clock of the system or server. Similarly, the term "device time" may refer to a time of a computing device clock or internal clock of the computing device (such as 11:59:00), or a time step indicative of a time of a computing device clock or internal clock of the computing device. The time step value may be indicative of a number of time steps of a particular time period. The particular time period may be the period between an initial time value and the time of the system or device clock or internal clock of the system or device. The particular time period may be the period between an initial time value and the authentication application time, which may be based on the device time and in some embodiments, the offset parameter value. For example, each time step may equate to 30 seconds, and so a time step of two is indicative of 60 seconds. The time step value may therefore be at a higher granularity than the actual device time or system time.

Figure 1:
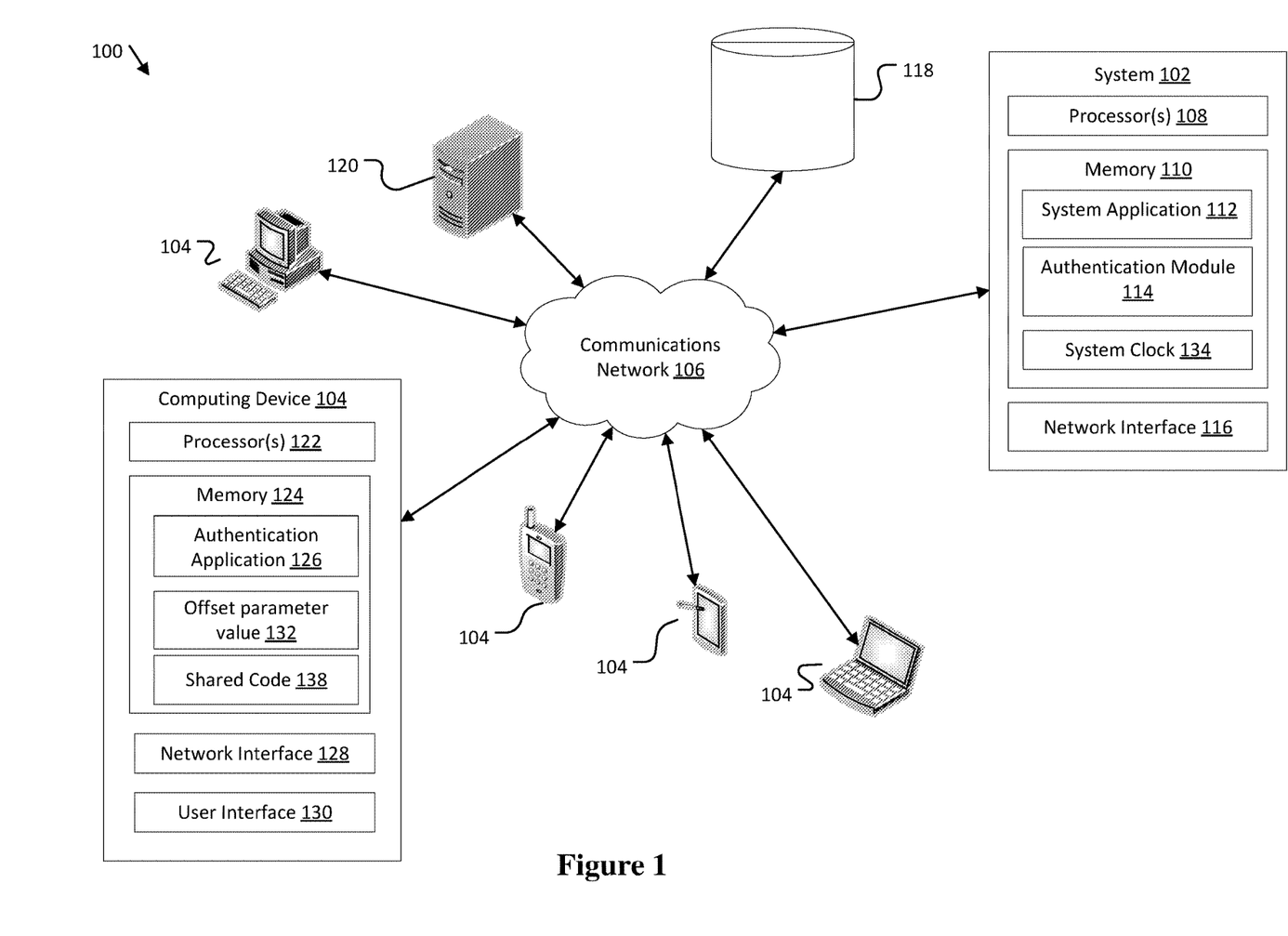
FIG. 1 is a schematic diagram of a communication system comprising one or more computing devices in communication with a server across a communications network.

Referring now to FIG. 1, there is shown a schematic of a communications architecture 100 comprising a system 102 in communication with one or more computing devices 104 across a communications network 106. The system 102 may comprise one or more servers configured to perform or provide services to client devices, such as the one or more computing devices 104.

In some embodiments, the system 102 may form part of an accounting system configured to maintain accounts for a plurality of entities and store financial and accounting related information, which may be stored in database 118. In some embodiments, the system is distinct from an accounting system (not shown) but nonetheless may be configured to communicate with and provide services to the accounting system (not shown) across the communications network 106. Examples of a suitable communications network 106 include a cloud server network, wired or wireless internet connection, Bluetooth™ or other near field radio communication, and/or physical media such as USB.

The system 102 comprises one or more processors 108 and memory 110 storing instructions (e.g. program code) which when executed by the processor(s) 108 causes the system 102 to function according to the described methods. The processor(s) 108 may comprise one or more microprocessors, central processing units (CPUs), graphical/graphics processing units (GPUs), application specific instruction set processors (ASIPs), application specific integrated circuits (ASICs) or other processors capable of reading and executing instruction code.

Memory 110 may comprise one or more volatile or non-volatile memory types. For example, memory 110 may comprise one or more of random access memory (RAM), read-only memory (ROM), electrically erasable programmable read-only memory (EEPROM) or flash memory. Memory 110 is configured to store program code accessible by the processor(s) 108. The program code comprises executable program code modules. In other words, memory 110 is configured to store executable code modules configured to be executable by the processor(s) 108. The executable code modules, when executed by the processor(s) 108 cause the system 102 to perform certain functionality, as described in more detail below. Memory 110 may comprise a system application 112 (for example, a remote application, service application or server-side application) configured to cooperate with one or more computing devices to thereby provide functionality or services to those computing devices. Memory 110 may comprise an authentication module 114 configured to perform multi-factor authentication processes as discussed in more detail below with reference to FIG. 2. In some embodiments, the authentication module 114 may be a component or module of the system 102. Memory 110 also comprises a system clock 134 configured to keep time for the system 102. The system 102 may be configured to communicate (periodically or aperiodically) with a time server, such as server 120, to ensure that the time of the system clock 134 is synchronized with a reference clock.

The system 102 further comprises a network interface 116 to facilitate communications with components of the architecture 100 across the communications network 106, such as the one or more computing devices 104, database 118 and/or other systems or servers 120. The network interface 116 may comprise a combination of network interface hardware and network interface software suitable for establishing, maintaining and facilitating communication over a relevant communication channel.

The database 118 may form part of or be local to the system 102, or may be remote from and accessible to the system 102. The database 118 may be configured to store user details, such as username(s), password(s), biometric data and/or other user data and one or more computing devices 104 associated with the user, such as a mobile phone.

The computing device(s) 104 may comprise one or more processors 122 and memory 124 storing instructions (e.g. program code) which when executed by the processor(s) 122 causes the computing device(s) 104 to cooperate with the system 102 to perform or participate in a multi-factor authorisation process according to the described methods.

Memory 124 comprises an authentication application 126 associated with system 102, and in some embodiments, the authorisation module 114, and which, when executed by processor(s) 122, enables the computing device 104 to cooperate with the system 102 to perform or participate in the multi-factor authorisation process.

Memory 124 may also comprise a computing device clock 136. Similar to the system clock 134, the computing device clock 136 may be configured to communicate (periodically or aperiodically) with a time server, such as server 120, to ensure that the time of the computing device clock 136 is synchronized with a reference clock.

Memory 124 may comprise one or more offset parameter values 132, each associated with a respective application, authentication module 114 or system 102. Each offset parameter value 132 may be indicative of a time synchronization error between the time of the computing device (device time) and the time of the respective system 102 (system time). For example, the offset parameter value 132 may be a positive value, indicative of a lag time of the device 104 behind that of the system 102, or may be a negative value, indicative of a lead time of the device 104 ahead of that of the system 102.

The offset parameter value 132 may be used by the authentication application 126 in conjunction with a current time of the computing device clock 136 to determine a synchronised authentication application time, synchronised with the time of system clock 134 of the system 102. The authentication application 126 relies on the offset parameter value 132 and the computing device clock 136 (together the synchronised authentication application time) to generate an authorisation code for transmitting to the authentication module 114 or system 102 to allow the system 102 to perform verification processes.

When a user creates an account with the authentication module 114, the user is asked to deploy the authentication application 126 on their computing device 104. During the account creation process, the user may provide the authentication module 114 with login details, such as a username and password, and the authentication module 114 may create an account for the user, associating the login details, and for example one or more computing device 104 associated with the user, in a user account registry (not shown). In some embodiments, the authentication module 114 generates (or otherwise acquires) and transmits to the authentication application 126, a shared code 138. In some embodiments, the system 102 and the computing device 104 are both equipped with a common transformation engine (not shown) configured to generate the shared code 138. The shared code 138 is a secret code, a private key, or a shared secret. The shared code 138 may be a pseudo random string of characters, which may be generated using any suitable pseudo random number generator, such as a cryptographically strong pseudorandom generator seeded with a random value. The authentication application 126 associates the shared code 138 with the relevant authentication module 114 or system 102 and saves it in memory 124.

In some embodiments, the authentication application 126 and/or authentication module 114 saves the shared code 138 by encrypting it using hardware encryption. Additionally, in some examples the shared code 138 is only decrypted when needed to generate, or validate, an authentication code, and re-encrypted immediately to limit exposure in the RAM to a short period of time.

Subsequently, for example, in response to a verification request or prompt, such as a "push" request, the authentication application 126 may generate an authentication code based on, or using the shared code 138, the current device time and optionally the offset parameter value 132. In some embodiments, the authentication code is a six digit code. However, it will be appreciated that in some embodiments, the authentication application 126 may generate an authentication code based on, or using the shared code 138, the current device time and optionally the offset parameter value 132, unprompted by a verification request. The generated authentication code may be saved in memory 124 as pre-generated and retrieved as required for transmitting to the system 102 for verification purposes. For example, on activation or instigation of the authentication application 126, the authentication application 126 may proactively and/or automatically generate the authentication code. In some embodiments, multiple authorisation codes can be pre-generated for a plurality of device times, and depending on when an authorisation code is required for sending to the system 102, the authentication application 126 may select a suitable authorisation code generated using a device time that corresponds or is appropriate for the current device time (that is, the time when the suitable authorisation code is selected). In some embodiments, the authentication application 126 periodically or regularly updates the pre-generated authentication codes.

In some embodiments, the authentication code may be generated at any suitable time, such as at pre-defined or periodic intervals. The authentication code may be stored in memory. In this embodiment, in response to a verification request or prompt, the previously generated authentication code corresponding to the current time (or time step value) may be retrieved from memory and sent in response to the request or prompt.

The authentication application 126 and the authentication module 114 may use a keyed-hash method, such as MD5, SHA-1, or RIPEMD-128/160, to generate the authentication code. In some embodiments, the authentication application 126 and the authentication module 114 use a Time-Based One-Time Password (TOTP) algorithm to generate the device and system originating authentication codes. A suitable TOTP algorithm is described in "TOTP: Time-Based One-Time Password Algorithm", D. M'Raihi et al, Internet Engineering Task Force (IETF), RFC 6238, Informational, ISSN: 2070-1721, May 2011(https://tools.ietf.org/html/rfc6238), the entire content of which is incorporated herein by reference. For example, the TOTP may generate the authentication code using the shared code 138 and a time step value. The time step value may be indicative of a number of time steps of a particular time period. For example, each time step may equate to 30 seconds, and so a time step of two is indicative of 60 seconds. The time step value is derived from the current device time, and in embodiments where an offset parameter value is available, the offset parameter value. For example, the current authentication application time may be determined as being the current device time plus the offset parameter value, and the time step value may be determined as being the number of time steps between an initial time value, and the current authentication application time. By deriving the authentication code using a time step value, as opposed to a specific time, authorisation codes that are generated with the same shared code and within the same time step will be the same. This provides a time window to account for transmission or network delays. However, it is generally recommended to minimise the time window, as larger windows have an impact on security and useability, making the authentication process more prone to attack. In some embodiments, the TOTP algorithm uses a keyed-hash methods such as HMAC, a mechanism for message authentication using cryptographic hash functions as described in "HMAC: Keyed-Hashing for Message Authentication", H. Krawczyk et al, Network Working Group, RFC 2104, Informational, February 1997 (https://tools.ietf.org/html/rfc2104).

The authentication application 126 may be downloaded or otherwise deployed on a user's computing device 104. It will be appreciated that the authentication application 126 may be configured to work with many different accounts, and/or different and non-connected systems or servers, irrespective of the application modules employed thereby. Accordingly, in some embodiments, the authentication application 126 maintains an offset parameter value and secret or shared code for each of the accounts or applications the authentication application 126 is configured to cooperate with.

In some embodiment, the authentication application 126 maintains an active register 140 of authorisation codes for each of the accounts or applications, each authorisation code being based on the associated shared code, current device time and the offset parameter value. A common offset parameter value may be used for accounts or applications deployed on a same system or server, whereas accounts or applications deployed on a different system or server may have different offset parameter values. The authorisation codes of the register 140 may be updated periodically, which may depend on a time step or period allowed by the associated system, as discussed in more detail below. In some embodiments, on opening or instigation of the authentication application 126, the authentication application 126 generates authorisation codes for each of the accounts or applications for which the authentication application 126 is configured to cooperate with to authorize the user, and are these codes maintained in the register 140, ready to be transmitted to the relevant server in response to verification requests or push notifications.

In some embodiments, memory 124 may comprise a web browser application (not shown) to allow a user to engage with the website(s) hosted by system 102.

The computing device(s) 104 comprises a network interface 128 to facilitate communication with the components of the communications network 106. The computer device(s) 104 may comprise also comprise a user interface 130 to allow the user to interact with the authentication application 126 and other applications or functionality provided by the computing device(s) 104.

Figure 2:
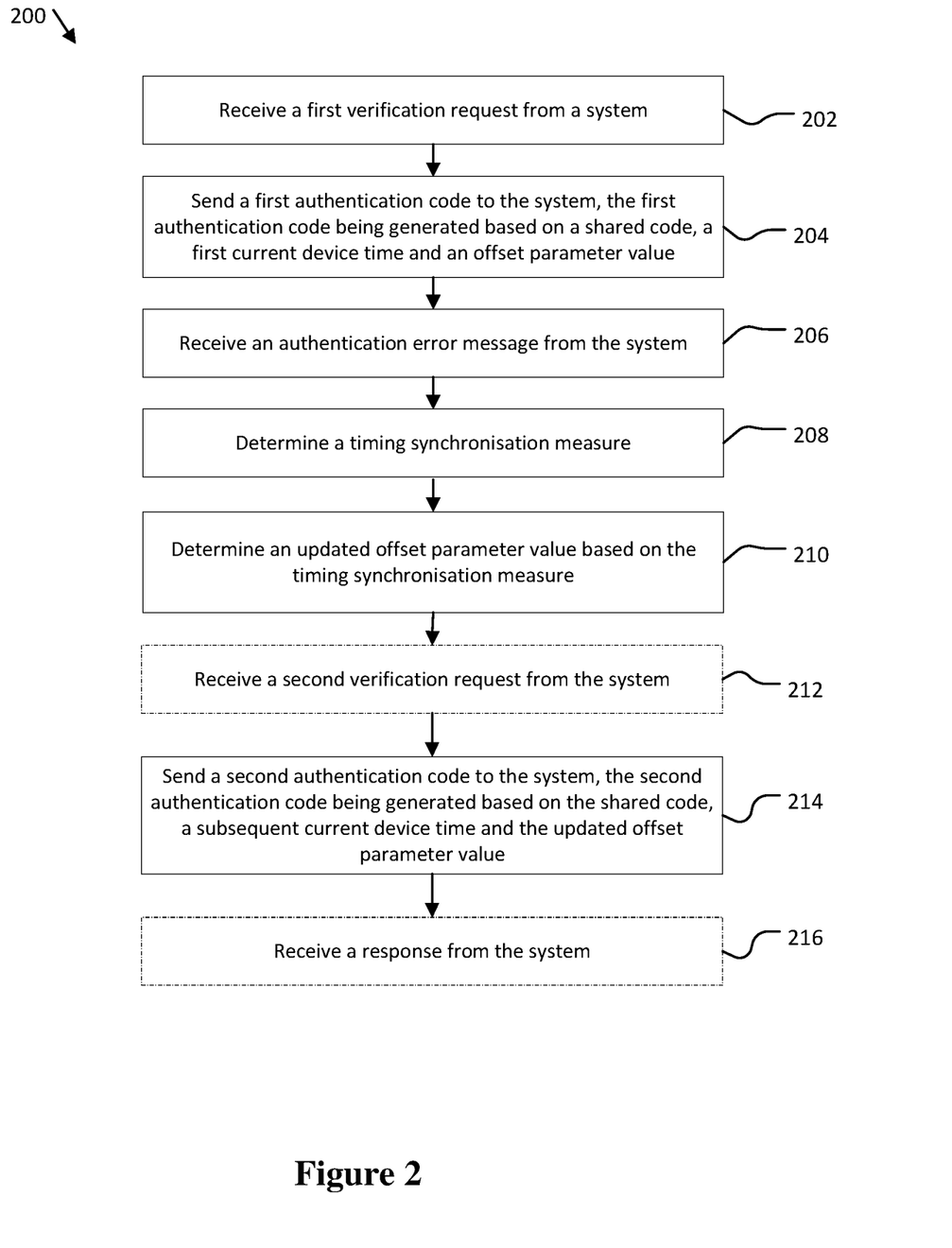
FIG. 2 is a process flow diagram of a method performed by an authentication application deployed on a computing device of the one or more computing devices of FIG. 1, according to some embodiments.

FIG. 2 is a process flow diagram of a method 200 for performing multi-factor authentication, according to some embodiments. The method 200 may, for example, be implemented by the processor(s) 122 of computing device 104 executing instructions stored in memory 124, such as the authentication application 126.

As explained above, during account creation with a particular system application 112 of a system 102, a computing device 104 associated with the user is provided with a shared code 138, which is stored in memory 124 of the user's computing device 104 and is accessible to the authentication application 126. Subsequently, the user seeking to be authenticated or verified with a server-side or system application 112, such as a website, or a remote system, submits a first authentication request to the system 102. In some embodiments, the first authentication request may comprise submitting or providing login details, such as a login name and password or biometric data or other identifying data, to the relevant system 102. The user may provide the first authentication request to the system 102 using a first computing device 104. For example, the authentication application 126 or another application deployed on the computing device 104 may be configured to send the first authorisation request to the system 102.

In response to receiving the first authentication request for the user, the authentication module 114 may be configured to determine one or more computing devices 104 associated with the user. For example, such information may be stored in a user profile in database 118. The authentication module 114 may transmit a first verification request (for example, a "push" request) to a second computing device 104 determined as being associated with the user. In some embodiments, the second computer device 104 may be the first computing device 104, and in other embodiments it may be a different computing device 104 associated with the user.

In some embodiments, at 202, the computing device 104 associated with the user may receive the first verification request from the system 102. As explained above, the first verification request may be received by the second computing device 104 in response to the first authentication request for the user being received at the system 102. In some embodiments, the second computing device 104 receives the first verification request as a push request, a text message, an email, a voice message, or an instant message, for example. In some embodiments, the authentication application 126 is deployed on the second computing device and the first verification request is automatically provided to the authentication application 126. In some embodiments, the authentication application 126 is deployed on a third computing device, different to the second computing device, and the first verification request is provided to the authentication application 126 via the second computing device, or via the user. For example, the user may enter the authentication request to authentication application 126 using the user interface of the third computing device. In other embodiments, the first, second and third computing devices are all the same device.

At 204, the authentication application 126 sends a first authentication code to the system 102. In some embodiments, the authentication application 126 sends the first authentication code unprompted by the system 102. The authentication code is generated using the shared code 138 and a first current device time and in some embodiments, the offset parameter value 132. It will be appreciated that when the authentication application is first used in conjunction with a particular system, and until a timing synchronization error is detected, no offset parameter value may have been determined, or the offset parameter value 132 may be set as zero.

Authentication application time may be determined as a current device time adjusted by the offset parameter value. For example, if the device time is 14:42:20, and the offset parameter value is 1 second, the authentication application time is determined to be 14:42:21. Accordingly, authentication application time may be different from the current device time of the computing device clock 136, i.e., where the offset is not equal to zero. However, the authentication application time may be the same time as the current device time, i.e., where the offset is zero.

By maintaining an offset parameter value, the authentication application 126 can effectively keep authentication application time that can account for variations in the computing device clock and mitigate authentication failures that might occur as a result of such variations. For example, if a user selects to have the computing device clock run at a particular time, such as, that of a different time zone, or a few minutes fast, that user preference can be accounted for by adjusting the offset parameter value accordingly. This means that although the authentication application 126 is reliant on the time of the computing device to function, it does not dictate that the device clock conform to specific systems or servers with which the authentication application 126 communicates to verify the user. Additionally, as opposed to maintaining a separate application clock, which runs independently of the device clock, as the device clock is updated (as may occur were the computing device to change time zones, for example), the offset parameter value remains fixed, and the authentication application time would automatically be updated as the device clock updates, thereby maintaining consistency in any discrepancy between the device clock 136 and the authentication application time. Yet further, by maintaining multiple offset parameter values, for example, one for each system or server with which the user has account(s), the authentication application 126 can support authentication or validation processes across multiple separate or distinct systems or servers.

In embodiments where the first verification request is provided to a second computing device 104, and the authentication application 126 performing step 204 is deployed on a third and different computing device 104, the user may be required to manually input or otherwise provide the first authentication code to the authentication application 126 of the third computing device 104. For example, the user may log on to an account with a server using their laptop. The server may identify a mobile phone of the user based on the logon details and may transmit the first verification request to the user's mobile phone, for example as a push notification. The user may then use an authentication application 126 running on their mobile phone or on another computing device 104 to transmit the first authentication code to the server. In other embodiments, the user may use the same computing device for providing the first authentication request, receiving the first verification request, and transmitting the first authentication code.

If the authentication code corresponds with a system generated authentication code generated using the system time and the shared code, the user will be authorised, and provided access to the account or application for which authentication was being requested. However, if the device generated authentication code does not correspond with or match the system generated authentication code, authentication fails.

At 206, the authentication application 126 receives an authentication error message from the system 102. An authentication error is generally received in situations where the authentication code provided by the computing device 104 does not match a system generated authentication code. Possible reasons for a discrepancy between the device generated authentication code and the system authentication code include (i) that a different shared code was used to generate the device authentication code than that used to generated the system authentication code; (ii) that a different code generation program was used to generate the device authentication code than that used to generated the system authentication code; and/or (iii) that the application time used to generate the device authentication code was not synchronised with the system time used to generate the system authentication code. In the latter case, the application time may be different from ("out of synch" with) the system time because the application time corresponds with the device time, and the device clock 136 is not synchronised with the system clock 134, or where an offset parameter value 132 is maintained, because the offset parameter value 132 does not accurately reflect any time synchronisation error between the device clock 136 and the system clock 134.

In view of the regularity with which error messages result from time synchronisation problems between computing devices 104 and systems 102, when an error message is received by the computing device 104 in response to the transmitting of the first authorisation code, the authentication application 126 automatically and proactively determines any timing error between the application time (based on the device clock 136 and any offset parameter value 132) and the system clock 134. In some embodiments, the user is not notified of the error message; that is, the authentication application 126 may intercept any such user error message being presented or otherwise communicated to the user and automatically perform steps 208 and 210, or indeed steps 208 to 214, to update the stored offset parameter value to account for the timing error in a way that is transparent to the user. Accordingly, any time synchronisation issues impacting the ability of the user to be verified are resolved more quickly, without requiring a user to determine that the problem may be a time synchronisation issue and attempt to take steps to resolve it manually. Further, if the issue is not a time synchronisation issue, it can be eliminated as a potential cause of the authorisation failure, thereby reducing the burden on the user or systems administrator in detecting a problem with the authentication application 126 and/or the authentication module 114.

At 208, responsive to receiving the authentication error message, the authentication application 126 determines, or automatically determines, a timing synchronization measure between the application time and system time (the system clock 134 of the system 102).

In some embodiments, the authentication application 126 sends a timing request to the system 102 and receives a timing response to the timing request from the system 102 and determines the timing synchronization measure from the timing response. In some embodiments, the authentication application 126 may assume that the system clock 134 is aligned or synchronized with a universal coordinated time (UTC). In such embodiments, the authentication application 126 sends a timing request to a universal coordinated time (UTC) server, such as server 120, receives a timing response from the UTC server and determines the timing synchronization measure from the timing response.

The timing response may comprise: (i) an origin timestamp, to, indicative of the application time (i.e., the device time, adjusted by the offset parameter value) when sending the timing request; (ii) a receive timestamp, $t_1$, indicative of the system time when the timing request was received; (iii) a transmit timestamp, $t_2$, indicative of the system time when sending the timing response; and (iv) a destination timestamp, $t_3$, indicative of the time of the application time when the timing response was received. For example, the round-trip delay may be calculated as $\delta=(t_3-t_0)-(t_2-t_1)$, and the timing synchronization measure may be defined as $$\theta = t_1 - t_0 - \frac{\delta}{2}, \text{ and } = t_2 - t_3 - \frac{\delta}{2}.$$

Accordingly, the timing synchronization measure between the application time of the authentication application 126 and the system 102 may be calculated as $$\theta = \left| \frac{(t_1 - t_0) + (t_2 - t_3)}{2} \right|.$$

In some embodiments, if the timing synchronization measure is determined to be zero, or sufficiently insignificant, the authentication application 126 may issue an error notification message, which may be provided to the user via the user interface 130. The error notification message may notify the user of the authentication failure, and may further indicate that the failure did not occur as a result of a timing synchronization issue. This information may assist the user in resolving the authentication failure problem more readily by eliminating one of the potential reasons for the failure from further investigations.

At 210, the authentication application 126 determines, or automatically determines, an updated offset parameter value 132 based on the timing synchronisation measure. For example, the authentication application 126 may be configured to determine the updated offset parameter value 132 as the sum of the previous offset parameter value 132 and the timing synchronisation measure. In some embodiments, step 210 is only performed where the authentication application 126 determines that the timing synchronisation measure is not zero, or is not sufficiently significant to warrant the generation of a further authorisation code to reattempt authorisation based on the updated offset parameter value 132. In some embodiments, the authentication application 126 does not consider the value or significance of the timing synchronisation measure, and performs step 210 even in situations where the updated offset parameter value 132 is substantially the same as the previous offset parameter value (i.e., the offset parameter value 132 used to generate the authentication code that resulted in an authentication failure).

In some embodiments, at 212, the authentication application 126 may receive a second verification request from the server. The second verification request may be received in response to a subsequent second authentication request for the user being received at the system 102. In some embodiments, the authentication application 126 or another application deployed on the computing device 104 may be configured to send the second authorisation request to the system 102. In other embodiments, a second computing device 104, different from the first computing device 104, or an application deployed thereon, may be configured to send the second authorisation request to the system 102.

However, in other embodiments, it may not be necessary to transmit a subsequent second authentication request to acquire a second verification request, and the first verification request may still be valid. This may depend on the permitted period of validity of the verification request, and the time taken to determine a synchronised authentication time and to transmit to the system, a second authentication code based on the synchronised authentication time. This may be particularly advantageous, as any synching problem that arises may be identified and resolved by the authentication application 126 without any need to inform the user or require additional user input or action. Accordingly, the user will only be informed of authentication errors where the issue is something other than a time synching error, which may reduce the number of failed verification attempts and improve the overall user experience.

At 214, the authentication application 126 sends a second authentication code to the system 102. The second authentication code is generated using the shared code 138, and a subsequent current device time and the offset parameter value 132. The authentication application 126 may determine a synchronized authentication time based on the subsequent current device time of the computing device 104 and the updated offset parameter value 132. The synchronized authentication time may be the subsequent current device time adjusted by the updated offset parameter value 132. For example, synchronized authentication time may be the sum of the subsequent current device time and the updated offset parameter value 132. The second authentication code is generated using the shared code 138 and the synchronized authentication time.

At 216, the authentication application 126 receives a response to the second authentication code. The response may comprise an indication that authorisation is approved, in which case, the user may be provided with access to the system application 112. In some embodiment, the indication that authorisation is approved may be automatically providing the user with access to the system application 112. On the other hand, the response may comprise a further error message, which may be indicative of an authentication problem other than a timing synchronisation error issue.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method comprising:
sending, from an authentication application deployed on a second computing device to a system, a first authentication code, the first authentication code being generated from a shared code and an authentication application time, wherein the shared code is a code previously shared between the second computing device and the system, and the authentication application time is based on a first current device time of the second computing device and an offset parameter value;
receiving, at the second computing device, an authentication error message from the system;
responsive to receiving the authentication error message, determining, by the authentication application, a timing synchronization measure between the authentication application time and system time;
determining, by the authentication application, an offset parameter value based on the timing synchronization measure;
determining, by the authentication application, a synchronized authentication application time based on a subsequent current device time of the second computing device and the offset parameter value; and
sending, from the authentication application to the system, a second authentication code, the second authentication code being generated from the shared code and the synchronized authentication application time.

2. The method of claim 1, further comprising:
receiving, at a first computing device from a system in communication with the first computing device across a communications network, a first verification request in response to a first authentication request for a user;
wherein the first authentication code is sent in response to receiving the first verification request.

3. The method of claim 1, further comprising:
receiving, from the system at a first computing device, a second verification request in response to a subsequent second authentication request for a user.

4. The method of claim 1, comprising:
sharing a secret code between the second computing device and the system during registration of a user with an application of the system.

5. The method of claim 1, comprising:
maintaining, by the authentication application, a register of offset parameter values, the register comprising the offset parameter value associated with the system, and one or more other offset parameter values associated with respective other systems.

6. The method of claim 1, further comprising:
automatically updating, by the authentication application, the offset parameter value as a sum of the offset parameter value and the determined timing synchronization measure.

7. The method of claim 1, wherein determining the timing synchronization measure comprises:
sending, by the authentication application, a timing request to the system;
receiving, by the authentication application, a timing response to the timing request from the system; and
determining the timing synchronization measure from the timing response.

8. The method of claim 1, wherein determining the timing synchronization measure comprises:
sending, by the authentication application, a timing request for UTC to a universal coordinated time (UTC) server;
receiving, by the authentication application, a timing response from the UTC server; and
determining the timing synchronization measure from the timing response.

9. The method of claim 7, wherein the timing response comprises:
(i) an origin timestamp indicative of a device time when sending the timing request;
(ii) a receive timestamp indicative of the system time when the timing request was received;
(iii) a transmit timestamp indicative of the system time when sending the timing response; and
(iv) a destination timestamp indicative of the device time when the timing response was received.

10. The method of claim 1, further comprising:
sending, from a third computing device to the system, a first authentication request for a user.

11. The method of claim 2, further comprising:
sending, from a third computing device to the system, the first authentication request for the user; and
sending, from the third computing device to the system, a second authorisation request for the user.

12. The method of claim 10, wherein a first computing device is the third computing device and is associated with the user.

13. The method of claim 10, wherein a first computing device and the third computing device are different devices and are both associated with the user.

14. The method of claim 2, wherein the first computing device is the second computing device and is associated with the user.

15. The method of claim 1, wherein a first computing device and the second computing device are different devices and are both associated with a user.

16. The method of claim 2, wherein the first authentication request for a user is a second or subsequent step of a multi factor authentication process.

17. A computing device comprising:
one or more processors; and
memory comprising computer executable instructions, which when executed by the one or more processors, cause the computing device to:
send, from an authentication application deployed on a second computing device to a system, a first authentication code, the first authentication code being generated from a shared code and an authentication application time, wherein the shared code is a code previously shared between the second computing device and the system, and the authentication application time is based on a first current device time of the second computing device and an offset parameter value;
receive, at the second computing device, an authentication error message from the system;
responsive to receiving the authentication error message, determine, by the authentication application, a timing synchronization measure between the authentication application time and system time;
determine, by the authentication application, an offset parameter value based on the timing synchronization measure;
determine, by the authentication application, a synchronized authentication application time based on a subsequent current device time of the second computing device and the offset parameter value; and
send, from the authentication application to the system, a second authentication code, the second authentication code being generated from the shared code and the synchronized authentication application time.

18. A non-transitory computer-readable medium storing instructions that, when executed by a computer, cause the computer to perform operations including:
sending, from an authentication application deployed on a second computing device to a system, a first authentication code, the first authentication code being generated from a shared code and an authentication application time, wherein the shared code is a code previously shared between the second computing device and the system, and the authentication application time is based on a first current device time of the second computing device and an offset parameter value;
receiving, at the second computing device, an authentication error message from the system;
responsive to receiving the authentication error message, determining, by the authentication application, a timing synchronization measure between the authentication application time and system time;
determining, by the authentication application, an offset parameter value based on the timing synchronization measure;
determining, by the authentication application, a synchronized authentication application time based on a subsequent current device time of the second computing device and the offset parameter value; and
sending, from the authentication application to the system, a second authentication code, the second authentication code being generated from the shared code and the synchronized authentication application time.

19. The computing device of claim 17, wherein the computer executable instructions, which when executed by the one or more processors, further cause the computing device to:
maintain, by the authentication application, a register of offset parameter values, the register comprising the offset parameter value associated with the system, and one or more other offset parameter values associated with respective other systems.

20. The computing device of claim 17, wherein the computer executable instructions, which when executed by the one or more processors, further cause the computing device to automatically update, by the authentication application, the offset parameter value as a sum of the offset parameter value and the determined timing synchronization measure.

* * * * *